United States Patent [19]

Bjorklund et al.

[11] 3,739,353

[45] June 12, 1973

[54] OPTICAL-ACCESS MEMORY DEVICE FOR NON-DESTRUCTIVE READING

[75] Inventors: Gunnar Bjorklund, Tyreso, Sweden; Joseph Borel, Echirolles; Jean Marine, Grenoble, both of France

[73] Assignee: Commissariat A L'Energie Atomique, Paris, France

[22] Filed: May 9, 1972

[21] Appl. No.: 251,739

[30] Foreign Application Priority Data

May 14, 1971 France .............................. 7117637

[52] U.S. Cl.......... 340/173 R, 307/238, 250/219 Q, 340/173 LS

[51] Int. Cl............................................... G11c 11/40

[58] Field of Search........................... 307/238, 279; 340/173 R, 173 LS; 250/219 Q

[56] References Cited

UNITED STATES PATENTS

| | | | |
|---|---|---|---|
| 3,341,825 | 9/1967 | Schrieffer | 340/173 R |
| 3,480,918 | 11/1969 | Benson | 340/173 R |
| 3,465,293 | 9/1969 | Weckler | 340/173 |
| 3,488,636 | 1/1970 | Dyck | 340/173 |
| 3,497,698 | 2/1970 | Phelan | 250/219 |
| 3,505,527 | 4/1970 | Slana | 340/173 |
| 3,626,387 | 12/1971 | Terman | 340/173 R |
| 3,634,927 | 1/1972 | Neale | 340/173 R |
| 3,623,026 | 11/1971 | Engeler | 340/173 R |

*Primary Examiner*—Terrell W. Fears
*Attorney*—William B. Kerkam, Jr.

[57] ABSTRACT

The memory device permits storage of a high density of information in binary form and comprises a p or n-type semiconductor substrate having a forbidden band *Eg* and two intermediate levels, the lower level being located at an energy *Ep* from the top of the valence band and the upper level at an energy *Ee* from the bottom of the conduction band, an array of memory cores distributed over the surface of the substrate, writing means for selectively populating the two intermediate core levels with majority carriers from the valence band, optical means for selectively illuminating the memory cores with photons of energy greater than the energy *Ei* between the two intermedaite levels, means for detecting the reaction of each memory core when this latter is illuminated by the optical means.

20 Claims, 4 Drawing Figures

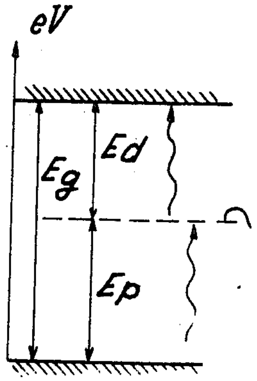
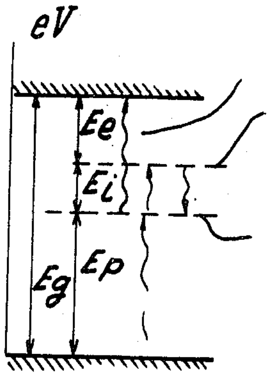
FIG.1 FIG.3
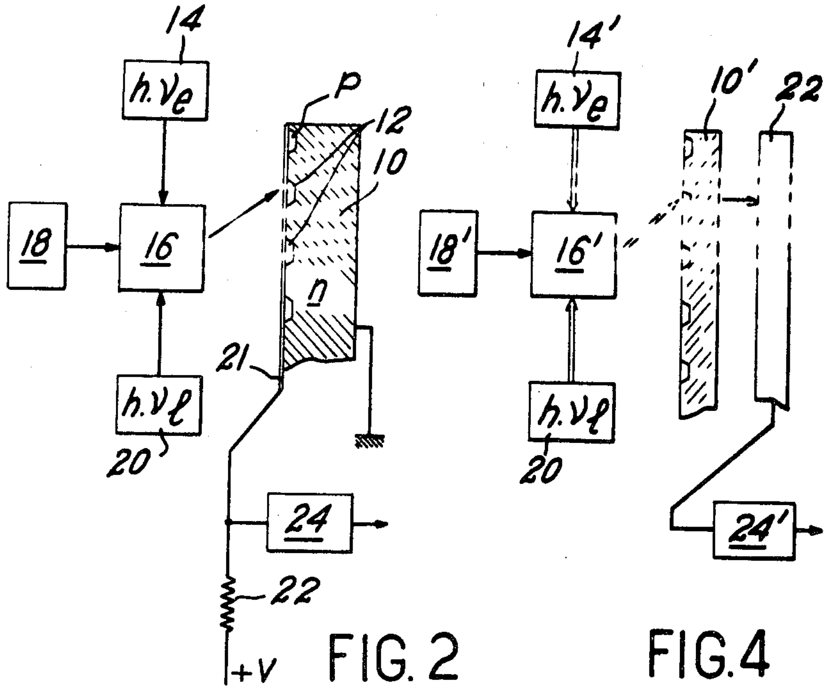
FIG. 2 FIG.4

OPTICAL-ACCESS MEMORY DEVICE FOR NON-DESTRUCTIVE READING

This invention relates to an optical-access memory device for storing a high density of information in binary form.

A number of different information-supporting media of the optical-reading type are already in existence. Mention can be made in particular of the photographic plate which has a disadvantage in that it can be employed only for constituting dead memories. It has also been proposed to make use of the photochrome film in which writing and reading are also optical in both cases and reference can be made in this connection to the R.C.A. Journal of Quantum Electronics Vol. QE5 No 1 p. 12 (1969) and to the article by Weitzmann entitled "Optical Technologies for future computer system design" which appeared in the Apr., 1970 issue of Computer Design, p. 169. However, this supporting medium calls for a high reading energy and has an insufficient lifetime. Finally, it has been attempted to make use of the magnetic film (manganese-bismuth) which has the advantage of not being subject to fatigue and of having a linear response but does have a disadvantage in that it entails high writing energy. Reference may be made in this connection to Chen et al. "Mn-Bi thin films" J.A.P. 39 No 8 July 1969, p. 3916 and to Mezrich et al. "Curie point writing of magnetic holograms" A.P.L. 14 No 4 Feb. 1969, p. 132.

Other memory devices which are also known entail the use of a semiconductor substrate having a forbidden band, a trapping level being present within said band and populated with majority carriers from the valence band. Reference can be made in this connection to U.S. Pat. No 3,341,825 as filed by J.R. Schrieffer and granted on Sept. 12th, 1967. This device is subject to the following disadvantage : the reading of information is carried out by selectively illuminating the memory cores of the substrate by means of photons having an energy of higher value than the energy which separates the trapping level from the bottom of the conduction band ; this accordingly results in destructive readout.

The aim of the invention is to provide a memory device with optical access, at least for reading, which meets practical requirements more effectively than comparable devices of the prior art, especially insofar as it removes or at least substantially reduces the disadvantages indicated in the foregoing, particularly by reason of the fact that the reading is non-destructive.

The invention accordingly proposes an optical-access memory device which comprises in particular :

a p or n semiconductor substrate having a forbidden band E*g* and two intermediate levels, the lower level being located at an energy E*p* from the top of the valence band and the upper level at an energy E*e* from the bottom of the conduction band ;

an array of memory cores distributed over the surface of the substrate ;

writing means whereby the lower of the two intermediate levels of said memory cores can be selectively populated with majority carriers from the valence band ;

optical means for selectively illuminating the memory cores with photons having an energy of higher value than the energy *Ei* which separates the two intermediate levels ;

means for detecting the reaction of each memory core when this latter is illuminated by said optical means.

The memory cores can be defined by diodes. The writing means can be optical (the memory cores being illuminated by means of photons whose energy is higher than Ep) or electrical (the diodes being forward-biased in order to populate the trapping level). The reading means can comprise a device for detecting the light which may be transmitted through the substrate when a memory core is illuminated by photons whose energy exceeds the difference *Ei* between the first intermediate level and the second level (but which is lower than the writing energy in order to prevent any information from being generated therein as a result of reading of a memory core).

In a preferred alternative form, the first intermediate level is a trapping level and the second intermediate level is an excited level of the first.

The device hereinabove defined makes it possible to attain a density of information which is limited in practice only by the degree of accuracy with which the beam of light intended for writing and/or reading is directed onto the surface of the substrate. A laser operating at the appropriate frequency will usually be employed as a light source, said laser being associated with a light-beam deflector and having a power of the order of 20 mW for reading, in the case of $10^4$ cores, for example.

A more complete understanding of the invention will be gained from the following description of a memory device of the type providing optical access and non-destructive reading. This description will be given by way of example without any implied limitation, reference being made to the accompanying drawings, in which :

FIG. 1 is a diagram representing the energy states of a semiconductor with a single trapping level ;

FIG. 2 is a block diagram showing the components of a device of the destructive reading type ;

FIG. 3 is similar to FIG. 1 and shows the energy states of a semiconductor having two intermediate levels which are intended to be employed in the construction of the device of FIG. 4 ;

FIG. 4, which is similar to FIG. 2, is a block diagram of a device providing non-destructive reading in accordance with the invention.

Before describing the devices which are illustrated in FIGS. 2 and 4, it may prove useful to recall a few concepts relating to semiconductors which have either one or two trapping levels. There are shown in FIG. 1 the top of the valence band and the bottom of the conduction band which constitute the two allowed energy bands. The conduction band corresponds to energies higher than those of the valence band and is separated therefrom by an energy interval *Eg* constituting the forbidden band. If the semiconductor has a trapping level, this latter corresponds to an intermediate energy between the top of the valence band and the bottom of the conduction band. It will be assumed hereinafter that this is a case of an electron trap (n-type semiconductor) but the same indications would be valid in the case of a hole trap (p-type semiconductor). If it is assumed that the trapping level is filled with electrons, the number of electrons which are capable of passing into the conduction band as a result of thermal agitation is given by the formula :

$$n = N_p \cdot \exp(-Ed/KT) \quad (1)$$

In formula (1), the notations are as follows :

$n$ : number of electrons per $cm^3$ which pass into the conduction band ;

$N_p$ : density of states of the trapping level ;

$Ed$ : energy separating the trapping level from the bottom of the conduction band ;

$KT$ : thermal energy within the semiconductor.

Formula (1) shows that, in order to retain on the trapping level the electrons which have been trapped therein, it is necessary to ensure that $Ed$ is of high value compared with $KT$ and this can be achieved in two ways :

a. by making use of a semiconductor material having a "deep" trapping level, that is to say which corresponds to a high value of $Ed$.

b. by maintaining the sample at low temperature in order that KT should be of low value.

Should it be desired to operate at a temperature close to room temperature, only the first parameter can be modified and this prohibits the use of ordinary materials such as silicon and germanium for which the forbidden band has a low width ($Eg = 0.7$ eV in germanium and 1.1 eV in silicon), which means that $Ed$ must also be of low value. On the other hand, there are other semiconductor materials, and in particular a number of different binary compounds, which have a forbidden band of greater width. Special mention can be made of gallium phosphide doped with oxygen or with copper, the forbidden band width $Eg$ of which is 2.26 eV and which has a deep trapping level located at 0.7 eV beneath the conduction band, that is to say in which $E_d = 0.7$ eV. A material of this type makes it possible to store electrons in the trapping level and to maintain them therein for several thousand hours at normal temperature. As stated earlier, the same comments apply in the case of a semiconductor material which makes it possible to store holes in the trapping level.

The device which is illustrated diagrammatically in FIG. 2 comprises a semiconductor substrate 10 having a wide forbidden band (for which the energy $Eg$ is at least equal to 2 eV) and a deep trapping level (that is to say in which $Ed$ is at least equal to 0.7 eV). There can be formed on said semiconductor 10 a matrix of surface barrier diodes or a matrix of p-n junction diodes which will be designated hereinafter by the term "diodes" for the sake of greater simplicity. The p-n junctions can be fabricated by means of a conventional diffusion and photoetching technique or by ion implantation. The $p$ zones can be formed in particular by diffusion of an acceptor impurity, namely zinc or cadmium in the case of gallium phosphide, for example.

The memory device also comprises means for injecting majority carriers (electrons in the case of an n-type semiconductor substrate) in order to populate the trapping level selectively beneath each diode. The device illustrated in FIG. 2 is intended to inject electrons by selective illumination of the corresponding diode by means of a light beam which transports an energy $h_e$ or, in other words, for optical writing. The device accordingly comprises a monochromatic source 14 which emits at a frequency such that the energy $h_e$ is higher than $Ep$ (difference between the trapping level and the top of the valence band). In the case of gallium phosphide as contemplated in the foregoing, the source 14 will be constituted, for example, by a laser operating at a wavelength of 5145 A, that is to say in the green region (argon laser). A deflector system 16 controlled by a sweeping mechanism 18 serves to illuminate selectively each of the diodes or each assembly of diodes.

Electric writing can be adopted instead of optical writing. In this case, the semiconductor substrate 10 is associated with a writing matrix constituted by a network of lead-wires which are of sufficiently small thickness to be transparent and deposited on the surface of the semi-conductor substrate, thereby permitting selective biasing of the diode which is intended to receive the information directly under a suitable potential difference in order to populate the trapping level or not.

However, preference is given to a mode of optical writing which permits writing in parallel of a large number of cores.

No matter which of the two above-mentioned modes of writing may be employed, the reading still remains optical and is controlled by a second light source 20 which emits at a wavelength such that the transported energy $h\nu_1$ is of higher value than $Ed$. A second condition must be satisfied unless provision is made for means whereby erasing takes place immediately after reading : the energy $h\nu_1$ must be of lower value than $Ep$ in order to prevent the interrogation of a diode from causing the appearance of information therein. In the case of gallium phosphide which was contemplated earlier and in which $Ed = 0.7$ eV, it would be possible to employ for the read operation a laser which emits at 1.1 $\mu$, that is to say in the infra-red region. If the diode which is illuminated by the reading beam contains an item of information, the energy of the light ray imparted to the trapped electrons cause these latter to pass into the conduction band. These electrons give rise to a current within a circuit which is external to the diode. If the writing is optical (case illustrated in FIG. 2), the current can be collected by a transparent metallic layer 21 which covers all the diodes and provides an ohmic contact therewith. In the contrary case, the measuring circuit is connected to the matrix which is designed so that each diode can be forward-biased selectively. The external measuring circuit which is brought by means of a resistor 22 to a bias −V ( of the order of 10 Volts, for example) is connected to a current-measuring apparatus 24.

The device as hereinabove defined has an advantage in that it provides optical reading with low power consumption and can also be employed with optical writing. HOwever, the read operation of this device is destructive and this is a troublesome property in the case of certain appliations. This drawback is removed by means of the device according to the invention as illustrated in FIG. 4 ; this device entails the use of a semiconductor material containing two intermediate levels or preferably one trapping level having a normal state and an excited state, this design solution being usually preferable to the use of a material having two different trapping levels since this latter provides lower reading sensitivity. However, it must be understood that all the indications which will be given hereinafter in connection with a semiconductor material having a normal trapping level and an excited trapping level are equally valid in the case of a material having two different trapping levels. FIG. 3 gives the energy diagram of a semiconductor which can be employed in practice.

In this figure, the following notations are adopted :

*Eg* : width of the forbidden band

*Ep* : energy separating the trapping level from the top of the valence band

*Ei* : energy separating the trapping level from the excited state of the trapping level

*Ee* : energy separating the excited state of the trapping level from the bottom of the conduction band.

In this case, writing will be carried out by causing the electrons of the valence band to pass to the trapping level while providing them with an energy *Ep*. Reading will be carried out by bringing the electrons which may be retained at the trapping level to the excited state, whence they return to the trapping level. Erasing is carried out by providing the electrons which occupy the trapping level with a sufficient energy to enable them to pass into the conduction band. In order that reading of a memory core in which the trapping level is vacant should not fill said trapping level or in other words should not write any information therein, and in order that the erasing signal should not be liable to introduce information at a memory core in which the trapping level is vacant, it is necessary to satisfy the following condition :

$$Ep > Ei + Ee$$

Moreover, in order to ensure that the information is retained, it is clearly necessary to ensure that $Ei + Ee$ should be very substantially larger than KT.

These conditions are fulfilled by a certain number of semiconductors having a wide forbidden band. In practice, it will be found necessary to adopt the following orders of magnitude :

$$Ep > 2\ eV$$

$$Ei\ \#\ 0.8\ \text{eV}$$

$$Ee\ \#\ 1\ \text{eV}$$

which results in a semiconductor having a forbidden band width of at least 4 eV.

The device which is illustrated diagrammatically in FIG. 4 makes use of a semiconductor having the above characteristics as well as means for writing, reading and erasing (these means being made necessary by the nondestructive character of the read operation).

The writing means have the further object of injecting electrons into the trapping level from the valence band. This result is achieved either by forward-biasing the diode or, as in the case of FIG. 2 and as illustrated in FIG. 4, by exciting the semiconductor material with a light beam which transports an energy $h_e$ such that $h\nu_e > Ep$ . If the values of *Ep*, *Ei* and *Ee* have the orders of magnitude indicated above, the electrons can be retained in the trapping level over long periods of time. In FIG. 4, in which the components corresponding to those of FIG. 2 bear the same reference numeral to which is assigned the prime index there is again shown a light deflector 16' controlled by an addressing device 18' which deviates the writing light beam produced by a source 14' which delivers photons of suitable energy. It will be possible in particular to employ as a monochromatic light source a laser which, in the case of the example given above, can be an argon laser.

The reading means shown in FIG. 4 involve modification of the properties of absorption of light by the material containing a trapping level having an excited level, according as the trapping level is populated or not. In order to read a memory core, there is directed onto this latter a light beam having a wavelength such that the transported energy $h_1$ should satisfy the conditions :

$$Ei < h\nu_1 < Ee + Ei$$

If electrons are retained in the trapping level they are brought into the excited level without being permitted to pass into the conduction band. They cannot remain in the excited level and fall back to their initial state : the light of energy $h\nu_1$ is absorbed by the material at the time of transfer from the trapping level to the excited level. The detection means will be constituted by a light detector 22 (mosaic of scintillator crystals associated with photomultipliers, for example) which is placed behind the semiconductor substrate 10' of small thickness. The output of the detector will also be collected in a measuring installation 24' which feeds the information utilization circuits.

Two cases will therefore arise at the time of reading :

If a datum has been written, that is to say if the trapping level is filled with electrons, the reading light beam of energy $h\nu_1$ derived from the source 20' causes said electrons to pass into the excited trapping level : the light is then absorbed by the semiconductor material 10' and no signal is delivered by the detector 22 ;

If, on the contrary, no information has been written, that is to say if the trapping level contains no electrons at the time of passage of the reading light beam into the memory core, there is no transfer of electrons from one level to another with energy absorption and a signal is delivered by the detector 22.

Instead of detecting the absorption or the absence of absorption of light by the substrate 10', other methods can be employed such as those based on the rotation of the plane of polarization of a light beam which is polarized as it passes through the substrate. This rotation is in fact different according as the memory core on which the light beam falls has either charged traps or vacant traps. In other words, a phenomenon which is comparable with the Pockels or the Kerr effect is employed in such a case.

Finally, it is possible to employ the phenomenon of luminescence related to the transition from the excited level to the lower trapping level, if this phenomenon is present. The radiation emitted by the memory core has a shorter wavelength than the wavelength of the reading radiation and can therefore be readily identified by means of filters.

In order to erase the information without any attendant danger of writing information in the memory cores which contain no information, it is only necessary to send successively to all the cores a light beam having an energy $h\nu_f$ which satisfies the condition $$Ei + Ee < h\nu_f < Ep$$

or to illuminate the whole of the front face by means of this light. A sufficient quantity of energy is thus imparted to the electrons retained in the trapping level to cause these latter to pass into the conduction band. Said electrons then flow into the external circuit and the energy of the light remains insufficient to populate the trapping level with electrons derived from the valence band.

The foregoing description shows that the invention provides a memory device having optical access at least insofar as reading is concerned, the access being optionally optical insofar as writing is concerned. The writing and reading energies can remain of very low value. The device is suitable for obtaining a high density of memory cores and reading is non-destructive. Finally, the device is not subject to any fatigue effect.

It is readily apparent that the invention is not limited to the embodiments which have been described by way of example with reference to the accompanying drawings but extends to all alternative forms which remain within the definition of equivalent means.

What we claim is :

1. A memory device comprising a p or n-type semiconductor substrate having a forbidden band *Eg* and two intermediate levels, the lower level being located at an energy *Ep* from the top of the valence band and the upper level at an energy *Ee* from the bottom of the conduction band;

an array of diodes distributed over the surface of said substrate;

electrical writing means comprising an electric circuit to selectively bias each diode in the forward direction to selectively populate the lower of the two intermediate levels with majority carriers from the valence band;

an optical source associated with light deflectors in front of said substrate for selectively illuminating the diodes with a light beam whose photons have an energy of higher value than the energy Ei which separates the two intermediate levels; and optical detectors placed behind said substrate.

2. A memory device comprising a p or n-type semiconductor substrate having a forbidden band Eg and two intermediate levels, the lower level being located at an energy Ep from the top of the valence band and the upper level at an energy Ee from the bottom of the conduction band;

a first optical source associated with light deflectors in front of said substrate for selectively illuminating a plurality of points of said substrate with photons of energy greater than Ep for selectively populating the lower of the two intermediate levels with majority carriers from the valence band;

a second optical source associated with light deflectors, in front of said substrate for selectively illuminating said points with a light beam whose photons have an energy of higher value than the energy Ei which separates the two intermediate levels; and optical detectors placed behind said substrate.

3. A device according to claim 2, wherein the lower intermediate level is separated from the bottom of the conduction band by an energy Ee at least equal to 0.7 eV.

4. A device according to claim 2, wherein the lower intermediate level is a trapping level.

5. A device according to claim 2, wherein said device includes erasing means having a source for illuminating the memory points with photons of energy lower than Ep but higher than the energy *Ee* + *Ei* which separates the lower intermediate level from the bottom of the conduction band.

6. A device according to claim 2, wherein said optical detectors include means for detecting any absorption of said light beam whose photons have an energy greater than *Ei*.

7. A device according to claim 2, with said optical detectors being means for detecting the luminescence of said substrate.

8. A device according to claim 2, with the optical sources being lasers.

9. A device according to claim 2, with *Ep* being on the order of 2 eV, *Ei* being on the order of 0.8 eV and *Ee* being on the order of 1 eV.

10. A device according to claim 2, with said optical source emitting photons with energy greater than Ei emitting in the vicinity of 1.1 $\mu$ wavelength.

11. A device according to claim 1, wherein the lower intermediate level is separated from the bottom of the conduction band by an energy *Ee* at least equal to 0.7 eV.

12. A device according to claim 1, wherein the lower intermedaite level is a trapping level.

13. A device according to claim 12, wherein the upper intermediate level is an excited state of said trapping level

14. A device according to claim 1, wherein said device includes erasing means having a source for illuminating the memory points with photons of energy lower than *Ep* but higher than the energy *Ee* + *Ei* which separates the lower intermediate level from the bottom of the conduction band.

15. A device according to claim 1, wherein said optical detectors included means for detecting any absorption of said light beam whose photons have an energy greater than Ei.

16. A device according to claim 1, with said optical detectors being means for detecting the luminescence of said substrate.

17. A device according to claim 1, with the optical sources being lasers.

18. A device according to claim 1, with *Ep* being on the order of 2 eV *Ei* being on the order of 0.8 eV and Ee being on the order of 1 eV.

19. A device according to claim 1, with said first optical source being an ionized argon laser which emits at least one of the two lines at 4880 A and 5145 A.

20. A device according to claim 1, with said optical source emitting photons with energy greater than Ei emitting in the vicinity of 1.1 $\mu$ wavelength.

* * * * *